US008149774B1

(12) United States Patent
Pawar et al.

(10) Patent No.: US 8,149,774 B1
(45) Date of Patent: Apr. 3, 2012

(54) SYSTEM, APPARATUS, AND METHOD FOR USE OF RESERVED PN-OFFSETS TO LIMIT CELLULAR WIRELESS COMMUNICATIONS (75) Inventors: Hemanth B. Pawar, Herndon, VA (US); Shilpa Kowdley Srinivas, Herndon, VA (US); Bhagwan Khanka, Lenexa, KS (US); Anoop K. Goyal, Overland Park, KS (US); John W. Prock, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 482 days.

(21) Appl. No.: 12/402,753

(22) Filed: Mar. 12, 2009

(51) Int. Cl.
H04W 4/00 (2009.01)
H04B 7/216 (2006.01)
(52) U.S. Cl. .................... 370/329; 370/335
(58) Field of Classification Search .............. 370/329, 370/332, 335, 341, 342
See application file for complete search history.

(56) References Cited

U.S. PATENT DOCUMENTS

| 5,682,605 | A | * | 10/1997 | Salter ........................... 375/145 |
| 6,115,609 | A | | 9/2000 | Kim et al. |
| 6,310,871 | B1 | * | 10/2001 | Kim ............................. 370/342 |
| 6,504,833 | B1 | * | 1/2003 | Ishii et al. .................... 370/342 |
| 7,277,709 | B2 | * | 10/2007 | Vadgama ...................... 455/453 |
| 7,773,502 | B2 | * | 8/2010 | Vannithamby et al. ........ 370/229 |
| 2003/0112851 | A1 | * | 6/2003 | Aust et al. ..................... 375/141 |
| 2005/0164709 | A1 | * | 7/2005 | Balasubramanian et al. 455/453 |
| 2005/0221849 | A1 | * | 10/2005 | Van Lieshout et al. ........ 455/509 |
| 2006/0135173 | A1 | * | 6/2006 | Vannithamby ................ 455/453 |
| 2008/0225991 | A1 | * | 9/2008 | Proctor et al. ................. 375/340 |

FOREIGN PATENT DOCUMENTS

| WO | WO 00/65863 | 11/2000 |
| WO | WO 01/47288 | 6/2001 |
| WO | WO 02/23758 | 3/2002 |

* cited by examiner

*Primary Examiner* — Chi Pham
*Assistant Examiner* — Farah Faroul (57) ABSTRACT

Disclosed in this document is an improved mechanism for notifying mobile stations that they should not seek to initiate a communication in a given wireless coverage area. The solution is to use a specially designated PN-offset as the indicator that a problem situation exists in the coverage area and that a mobile station should not seek to initiate communication in the coverage area. When a RAN detects a problem condition in a coverage area, the RAN changes the PN-offset of the coverage area to be a reserved PN-offset, and mobile stations are programmed to not seek service on any reserved PN-offset. Advantageously, the process helps stop mobile stations from operating in a problem coverage area without requiring the mobile stations to first lock onto the PN-offset of the coverage area and to then receive some sort of overhead message directing the mobile stations to not operate in the coverage area.

21 Claims, 6 Drawing Sheets

SYSTEM, APPARATUS, AND METHOD FOR USE OF RESERVED PN-OFFSETS TO LIMIT CELLULAR WIRELESS COMMUNICATIONS

BACKGROUND

In a typical cellular radio communications system (wireless communication system), an area is divided geographically into a number of coverage areas (namely, cells and cell sectors), each defined by a radio frequency (RF) radiation pattern from a respective base transceiver station (BTS) antenna structure. The base station antennae of the coverage areas may then be coupled with a base station controller (BSC) (or radio network controller (RNC)), which may then be coupled with a telecommunications switch or gateway, such as a mobile switching center (MSC) or packet data serving node (PDSN) for instance. The switch or gateway may then be coupled with a transport network, such as the public switched telephone network (PSTN) or a packet-switched network (e.g., the Internet).

When a mobile station (such as a cellular telephone, pager, or appropriately equipped portable computer, for instance) is positioned in a coverage area, the mobile station communicates via an RF air interface with the BTS antenna of the coverage area. Consequently, a communication path may be established between the access terminal and the transport network, via the air interface, the BTS, the BSC and the switch or gateway.

In practice, communications over the air interface between a BTS (base station) and a access terminal will comply with a defined air interface protocol or "access technology." Numerous such protocols are well known in the art, and others will be developed in the future. Examples of existing protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth.

In general, whichever air interface protocol is used will provide some mechanism to distinguish communications in one wireless coverage area from communications in adjacent coverage areas, so as to avoid or minimize the possibility of interference. Some air interface protocols, for instance, provide for use of different RF carrier frequencies in adjacent coverage areas. Other air interface protocols, for instance, use a common RF carrier frequency throughout and instead use a special form of coding or signal modulation to distinguish communications in one coverage area from those in adjacent coverage areas. Code Division Multiple Access (CDMA) is an example of the latter.

In a CDMA system, each wireless coverage area has a respective PN-offset used to uniquely spread (encode) communications transmitted from the BTS to mobile stations in the coverage area. The PN-offset is a unique timing offset or delay. In practice, the BTS applies the PN-offset to a pseudo-random number sequence (actually two parallel sequences, known together as the "PN short code"), and the BTS then applies the resulting sequence to communications to be transmitted over the air. Properly equipped mobile stations in the coverage may then apply the same PN-offset to decode and uncover the underlying communication from the BTS, while rejecting communications using other PN-offsets.

In a typical CDMA implementation, all of the PN-offsets are the same length and do not overlap with each other. For instance, in one CDMA system, each PN-offset may be 64 chips (i.e., square wave pulses) in length. With a PN short code of 32,768 chips, such a system would therefore have 512 possible PN-offsets.

Through engineering design, a CDMA service provider will allocate PN-offsets to the coverage areas throughout its system in a way that avoids having adjacent or nearby coverage areas use the same PN-offset. Furthermore, to avoid confusion between similar PN-offsets, the service provider may be set overall to use PN-offsets that are spaced apart by some increment, such as only every three PN-offsets for instance. For example, the service provider may allocate to its various coverage areas the PN-offsets 0, 3, 6, 9, 12, and so forth. That way, if a mobile station detects a communication on some intervening PN-offset, such as PN-offset 8 for instance, the mobile station may safely assume that the communication was encoded with the next lower possible PN-offset but that the distance and delay of transmission from the BTS to the mobile station skewed PN-offset by the time it arrived at the mobile station.

In each CDMA coverage area, a serving BTS may transmit on a number of specially coded air interface channels. Each channel is encoded with the sector's PN-offset to uniquely associate the communication with the sector. But in addition, each channel may also be uniquely encoded with a respective "Walsh Code," to uniquely define the channel. In some CDMA implementations, there are 64 possible Walsh codes per coverage area. Typically, Walsh Code 0 defines a "pilot" channel for the coverage area, which functions as a structural beacon to allow mobile stations to detect and evaluate the signal strength the coverage area. Walsh Code 32 defines a "sync" channel for the coverage area, which carries system identification and parameter information for use by mobile stations seeking service in the coverage area. One or more of Walsh Codes 1-7 are each used to define a "paging" channel for the coverage area, which functions to carry pages, system parameters, and call setup/management information. And all of the remaining Walsh Codes are used to define "traffic" channels, which are assigned to individual mobile stations to carry bearer traffic such as voice and other user data. In the event more channels are needed in a coverage area, a wireless service provider can add another RF carrier frequency to the coverage area or can subdivide the wireless coverage area into multiple wireless coverage areas each supporting a full set of its own channels.

(Note that in other CDMA implementations or with other protocols that use PN-offsets, BTS transmissions in each coverage area can be divided into channels in other ways. For instance, in the more recently developed 1xEV-DO standard, while each coverage area has its own PN-offset, BTS transmissions are divided into channels through time-division-multiplexing, where a recurring timeslots are divided into time segments that function to define a pilot channel, a control channel (such as paging and other broadcast signals), and a traffic channel. Other PN-offset based protocols are possible as well.)

In practice, when a CDMA mobile station is idle (i.e., not currently engaged in a call—namely a voice call, a data session, or any other communication session), the mobile station will scan the airwaves in search of the strongest pilot signal. To do so, the mobile station may cycle through the PN-offsets, iteratively attempting to tune to each one, i.e., to find a pilot signal on the PN-offset, and the mobile station may note the signal strength of each pilot signal that it detects and then select the strongest detected pilot. The mobile station may then "idle" on the coverage area of the strongest detected pilot. Namely, once the mobile station has identified the applicable PN-offset, the mobile station may then read other control channel data on that PN-offset to determine operational parameters of the coverage area, and the mobile station may then monitor a paging channel on the PN-offset, awaiting receipt of any incoming page messages or other relevant overhead information. Further, if the mobile station then seeks to initiate a call, the mobile station may transmit an origination message to the BTS in the selected coverage area, to begin the process of call origination.

When a CDMA mobile station is active (i.e., currently engaged in a call or at least having an assigned traffic channel or call connection), the mobile station will typically maintain an "active set" of the strongest coverage areas in which the mobile station will concurrently receive call data. (Advantageously, CDMA allows a mobile station to receive the same data at the same time from multiple coverage areas. The mobile station may then select the best quality data on a frame by frame basis or perhaps combine the received data for optimal reception; further, by communicating concurrently in multiple coverage areas, the mobile station can more seamlessly hand off from one coverage area to another, dropping one of the coverage areas and adding a new one, without interrupting the call.)

During the course of an active call, the mobile station may then similarly scan the airwaves in search of the strongest pilot signal. If the mobile station finds a pilot signal that is stronger than the weakest pilot signal in its active set, the mobile station may report the detected PN-offset to the BTS, and the BTS—or more likely a BSC—may then direct the mobile station to "hand off" to the new coverage area, giving the mobile station a new active set that the mobile station should use to continue its call.

The BSC that controls a CDMA coverage area typically provides to each mobile station in the coverage area a "neighbor list," which is a list of coverage areas adjacent to the coverage area. When a mobile station is active, the mobile station may then scan the PN-offsets in an order giving priority to members of its active set, giving next priority to members of its neighbor list, and giving next priority to all remaining possible PN-offsets. The specific prioritization and scanning order typically varies from equipment vendor to equipment vendor.

Overview

At times, a cellular wireless coverage area can become congested or can suffer from other conditions that may limit the availability or quality of mobile station communication. For instance, when many mobile stations are operating in the coverage area, the resulting demand on the air interface resources (e.g., numbers of Walsh Code traffic channels, number of time slots, quantity of BTS transmission power) or other network resources (such as capacity of links between BTS and BSC or other backhaul links) may prevent the BTS from devoting optimum resources to a given mobile station. As a result, mobile stations may encounter more interference and lower signal strength of received signals, mobile stations may experience dropped and blocked calls, and mobile stations may suffer other communication problems.

It would therefore be desirable to notify mobile stations when a problem condition (such as threshold high load, for instance) exists in the coverage area, so as to prevent mobile stations from seeking to initiate communication in the coverage area.

One way to provide this notification is for the BTS to broadcast a congestion-indicator of some sort in one of its overhead messages. In particular, once a congestion-state is detected in the coverage area, the BTS (perhaps at the direction of its governing BSC) may set a congestion-indicator bit in an overhead message that the BTS broadcasts in the coverage area, such as in a sync channel message or paging channel message for instance. Each mobile station that is monitoring the control channel(s) of that coverage area may then programmatically detect the set congestion-indicator bit and may responsively switch over to operate in some other coverage area instead, so as to avoid operating in the congested coverage area. For instance, if a mobile station would normally seek to initiate a call in the coverage area, the mobile station may note the congestion-indicator bit and may responsively instead seek to initiate the call in a next strongest coverage area.

Unfortunately, however, in order for a mobile station to receive and respond to such a congestion-indicator (or other such problem-condition notification), the mobile station would need to first lock onto the coverage area at issue. Namely, the mobile station would need to first detect the strong-enough pilot signal of the coverage area and, having thereby determined the PN-offset to use, then begin to monitor one or more control channels of the coverage area. Only upon monitoring the applicable control channel would the mobile station then detect the congestion-indicator being broadcast as an indication that the mobile station should not operate in the coverage area.

Disclosed in this document is an improved mechanism for notifying mobile stations that they should not seek to initiate a communication in a given coverage area (whether at the start of the communication or through handoff). The innovative solution is to use a specially designated PN-offset as the indicator that a problem situation exists in the coverage area and that a mobile station should not seek to initiate communication in the coverage area.

In practice, a wireless service provider will reserve one or more PN-offsets to use for this purpose. In normal operation, such reserved PN-offsets will not be used by any coverage area in the service provider's system. However, when a high-load situation or other problem situation is detected in a coverage area, the PN-offset of the coverage area will be dynamically changed temporarily to be one of the reserved PN-offsets. Served mobile stations will further store data specifying the one or more reserved PN-offsets (e.g., a listing of the PN-offsets that are reserved) and will be programmed to not seek communication initiation in any coverage area that uses one of the reserved PN-offsets.

For example, a mobile station may programmatically refer to its stored data to determine the one or more reserved PN-offsets and omit each reserved PN-offset from the mobile station's process of scanning for pilot signals. That way, when the PN-offset of a coverage area has been temporarily changed to be one of the reserved PN-offsets, a mobile station that would normally seek communication initiation (e.g., call origination, or beginning to monitor control messages) in the coverage area would not scan the PN-offset and would therefore not seek communication initiation in the coverage area.

As another example, a mobile station may programmatically refer to its stored data to determine the one or more reserved PN-offsets and, based on the data, take no action in response to detecting such a PN-offset. That way, when the PN-offset of a coverage area has been temporarily changed to be one of the reserved PN-offsets, a mobile station that would normally seek communication initiation in the coverage area upon detecting a strong pilot signal on the PN-offset will instead not seek communication initiation in the coverage area upon detecting a strong pilot signal on the PN-offset.

In either case, an advantage of this arrangement is that the mobile station need not go through the process of locking onto the coverage area at issue only to then read a control signal broadcast in the coverage area indicating that the coverage area should not be used. The arrangement is thus more efficient.

Furthermore, other benefits result from the proposed arrangement. For one, it becomes possible to limit operation of the process to just certain mobile stations, such as mobile stations that have a premium service-level-agreement (SLA). In practice, such high-service-level mobile stations can be programmed with the data specifying the one or more reserved PN-offsets and with logic causing the mobile stations to not seek communication initiation on any of the reserved PN-offsets. Whereas, low-service-level mobile stations might not be programmed with the data or logic and may therefore still seek communication initiation on the reserved PN-offsets, just as they would on any PN-offset. As a result, the high-service-level mobile stations may be forced to operate instead in a less congested (or otherwise less problematic) coverage area, while the low-service-level mobile stations may still operate in a coverage area even though the coverage is experiencing problems.

These as well as other aspects and advantages will become apparent to the reader of the following detailed description, with reference where appropriate to the accompanying drawings.

DETAILED DESCRIPTION

Referring to the drawings, as noted above, FIG. 1 is a simplified block diagram of a communication system in which the innovative arrangement and process can be implemented. As shown, the communication system includes at its core a radio access network (RAN) 12, which functions to provide multiple mobile stations with cellular wireless communication service.

Figure 1:
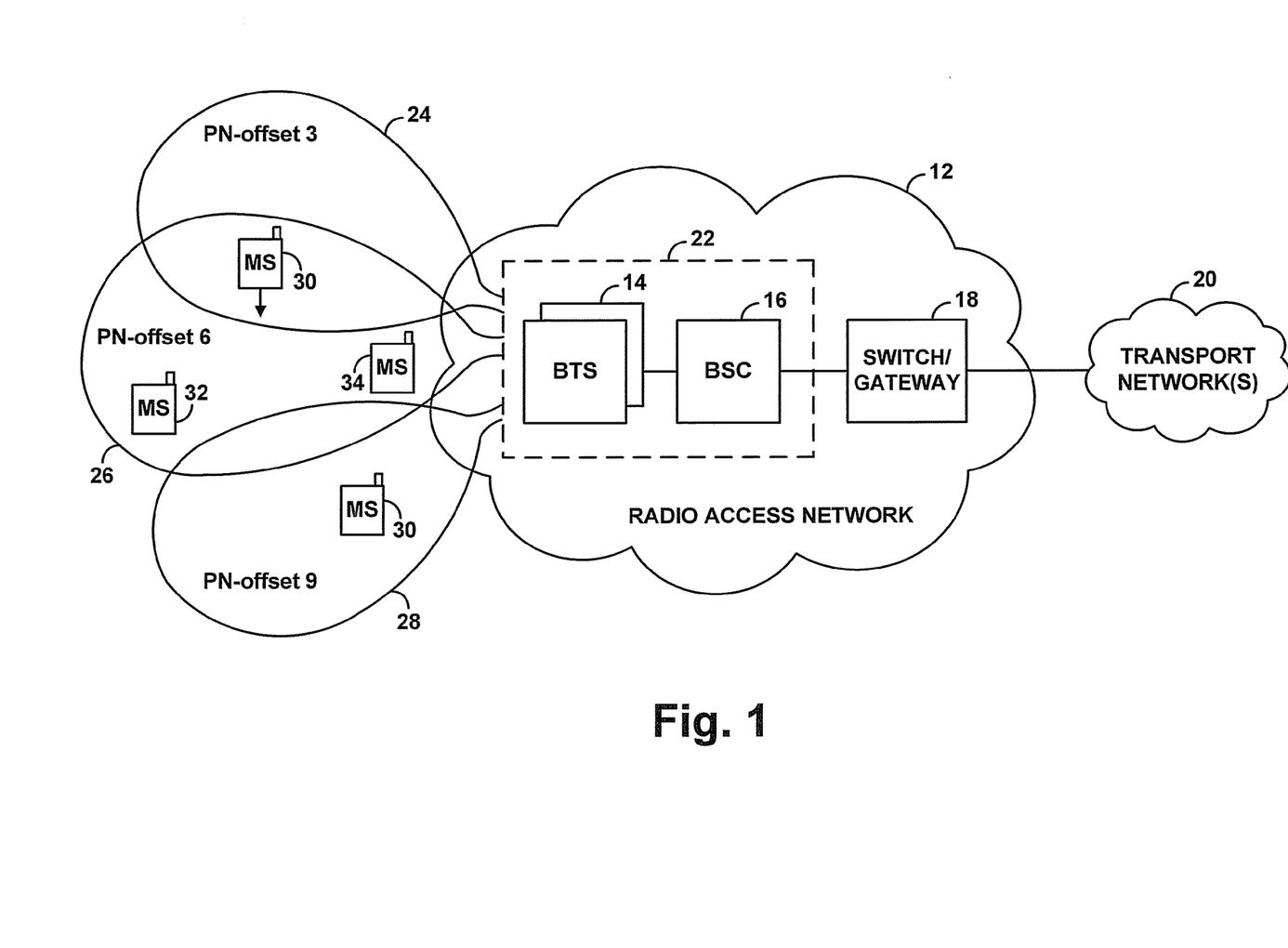
FIG. 1 is a simplified block diagram of a cellular wireless communication system in which the innovative arrangement and process can be implemented.

In practice, the RAN can take various forms, ranging from a simple wireless access point router to a more complex arrangement including potentially multiple BTSs, BSCs and other entities. By way of example, the RAN 12 in FIG. 1 is shown to include multiple BTSs 14, all of which are communicatively linked with a BSC 16. The BSC 16 is then communicatively linked with a switch and/or gateway 18, which provides connectivity with one or more transport networks 20, such as the PSTN or a packet-switched network such as the Internet. A dashed box 22 is shown around the BTSs and the BSC, to represent generally any combination or subset of those elements (or, for that matter, potentially other elements such as switch/gateway 18, even though not shown in the box), as certain functions of the example process can be implemented by any element(s) of the RAN without specific limitation.

The BTSs 14 are shown radiating to define various wireless coverage areas, designated by reference numerals 24, 26, and 28. These coverage areas can be cells but would more likely be cell sectors, defined by directional BTS antenna elements. The coverage areas may emanate from a common BTS, as different sectors of a common cell for instance, or may emanate from different BTSs. The important point is that they are different wireless coverage areas, each of which will normally operate on a respective PN-offset so as to distinguish BTS transmissions in one coverage area from BTS transmissions in another coverage area, as discussed above. For sake of illustration and without limitation, coverage area 24 is shown using PN-offset 3, coverage area 26 is shown using PN-offset 6, and coverage area 28 is shown using PN-offset 9.

Shown within the various example coverage areas are some example mobile stations 30, 32, 34, 36. Mobile station 30 is specifically shown in an area of overlap between coverage area 24 and coverage area 26, heading in a direction away from coverage area 24 and into coverage area 26.

In normal practice, mobile station 30 will regularly cycle through all possible PN-offsets, attempting to scan for a strong pilot signal on which to operate, also as discussed above. Thus, in the scenario shown, mobile station 30 may currently be operating on PN-offset 3 of coverage area 24 (e.g., actively engaged in a call on PN-offset 3, or merely monitoring PN-offset 3 for page messages or the like), and mobile station 30 may be cycling through all of the possible PN-offsets (e.g., the 512 possible PN offsets in certain implementations) in search of a stronger pilot signal. As the mobile station is moving into coverage area 26, the mobile station may thereby detect a pilot on PN-offset 6 of coverage area 26, and if that pilot is strong enough, the mobile station may commence communication on PN-offset 6 (e.g., hand off onto PN-offset 6, originate a call on PN-offset 6, or simply monitor a control channel on PN-offset 6).

As presently contemplated, one or more entities of RAN 12 will monitor the state of a wireless coverage area and, upon detecting a problem state of the coverage area will temporarily change the PN-offset of the coverage area to be a reserved PN-offset on which at least one of the mobile stations is arranged to not seek communication initiation. A preferred place to carry out this function in the RAN is in the BSC 16, since the BSC can then maintain a pool of reserved PN-offsets and divvy them out to problem coverage areas as necessary, and since the BSC is likely to know the state of each coverage area or to be able to learn the state of each coverage area. However, the function could be carried out in other entities, such as any combination or subset of RAN entities 22 for instance.

Figure 2:
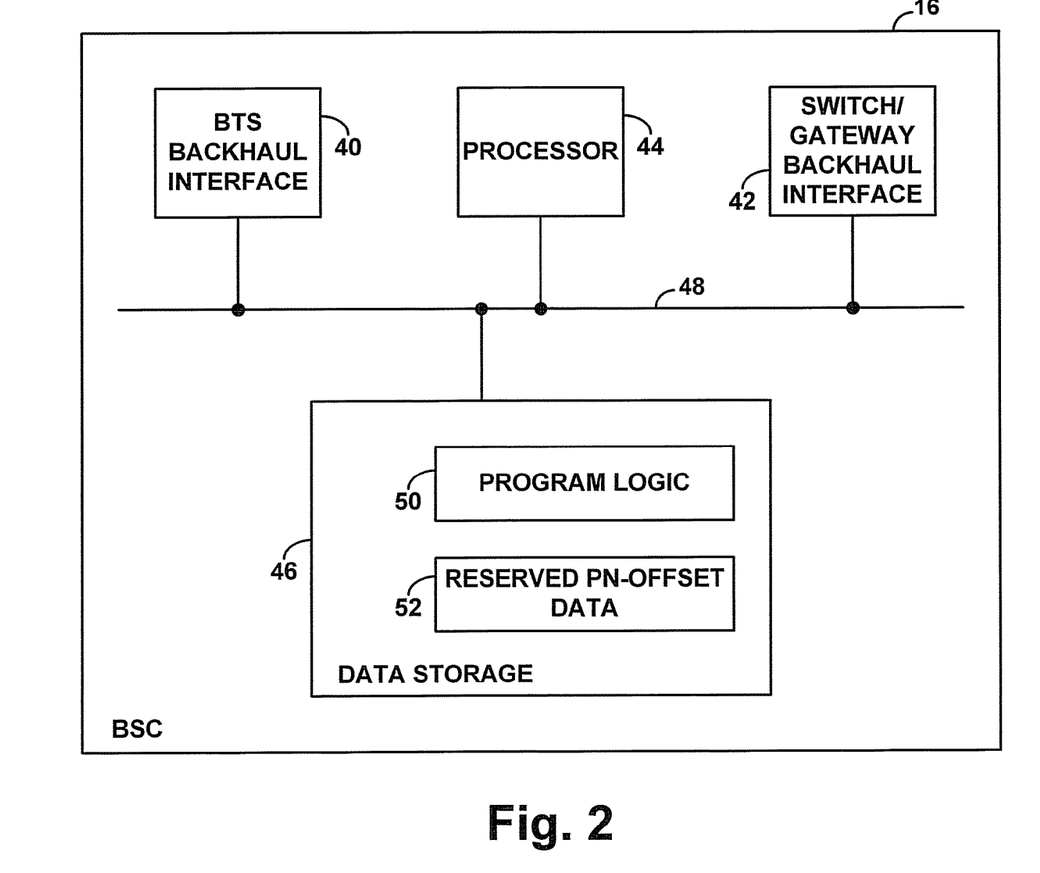
FIG. 2 is a simplified block diagram of a BSC and/or BTS arranged to implement aspects of the process.

FIG. 2 is a simplified block diagram of BSC 16, showing some of the functional components that the BSC may include to facilitate detecting a problem state of a coverage area and responsively temporarily switching the PN-offset of the coverage area to be a reserved PN-offset that will prevent at least one mobile station from operating on the PN-offset. As shown, the BSC includes a BTS backhaul interface 40, a switch/gateway backhaul interface 42, a processor 44, and data storage 46, all of which may be communicatively linked together by a system bus, network, or other connection mechanism 48.

BTS backhaul interface 40 functions to provide connectivity with the one or more BTSs within control of the BSC 16. Thus, through BTS backhaul interface 40, the BSC would connect with each of the BTSs in its control, and control signaling and user traffic can thereby flow between the BSC and the BTSs. Through the BTS backhaul interface 40, the BSC may manage BTS transmission power, handoff between various coverage areas, and other BTS and air interface functions.

Switch/gateway backhaul interface 42 functions to provide connectivity with a switch (such as a mobile switching center or softswitch) and/or gateway (such as a packet data serving node or a media gateway). A switch or gateway may function in some ways to control BSC or may simply function as a passage between the BSC and one or more transport networks. The details are not significant.

Processor 44 may comprise one or more general purposes processors (e.g., INTEL microprocessors) and/or one or more special purpose processors (e.g., dedicated digital signal processors or application specific integrated circuits). If the processor comprises multiple processors, the processors could work separately or in combination (e.g. in parallel).

Data storage 46, in turn, comprises one or more volatile and/or non-volatile storage components, such as magnetic, optical, or organic storage components, which can be integrated in whole or in part with processor 44. As shown, data storage 46 may contain program logic 50, which can be executed by processor 44 to carry out various RAN functions described in this document, such as detecting a problem state in a coverage area and responsively causing the coverage area to temporary switch to use of a reserved PN-offset. Alternatively or additionally, such functions can be implemented by one or more special-purpose processors such as those noted above, or by other hardware, firmware, and/or software.

Data storage 46 is further shown including reserved PN-offset data 52. The reserved PN-offset data 52 preferably includes a list (e.g., table) of PN-offsets that are specially reserved for use by a coverage area to indicate a problem state of the coverage area and to thereby cause one or more mobile stations that would otherwise seek service in the coverage area to not do so. For instance, the reserved PN-offsets might be PN-offset 339, PN-offset 378, and PN-offset 495, or one or more other PN-offsets that are to be specifically reserved for at least this purpose. (The PN-offsets may be designated individually by number and/or by ranges of PN-offsets.) In allocating PN-offsets to the various coverage areas in its system, the service provider that operates RAN 12 would not allocate the reserved PN-offsets, as the reserved PN-offsets would instead be dynamically assigned temporarily to cause one or more mobile stations to not seek service in the coverage area.

The reserved PN-offset data 52 also preferably includes an indication of whether a reserved PN-offset is currently in use. In practice, when the BSC directs a BTS to use a reserved PN-offset in a particular coverage area, the BSC may note that fact in the reserved PN-offset data 52, designating which coverage area is using the reserved PN-offset. The BSC may then programmatically avoid assigning the same reserved PN-offset concurrently to any adjacent or nearby coverage area. This will have the benefit of allowing one or more mobile stations to still be served on the reserved PN-offset(s), without experiencing confusion by having nearby coverage areas use the same PN-offset.

Figure 3:
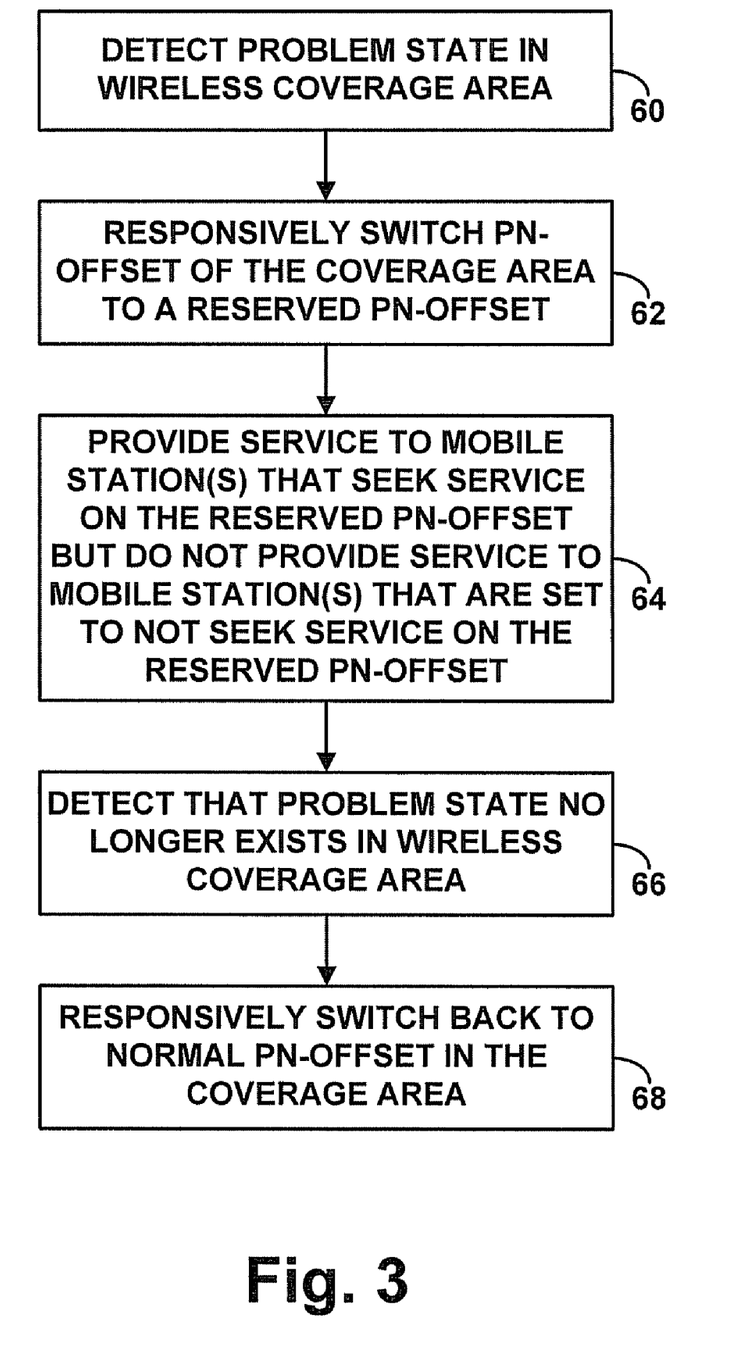
FIG. 3 is a flow chart depicting functions that can be implemented by a BSC, BTS, and/or other RAN entity to implement aspects of the process.

FIG. 3 is a flow chart depicting functions that can be carried out by the BSC 16 or one or more other entities. As shown in FIG. 3, at block 60, the BSC detects a problem state in a give coverage area, such as coverage area 26 for instance. (The BSC may check the state periodically to make this determination.) The problem state may take various forms. In one implementation, for instance, the problem state may be a threshold high-load condition in the coverage area. The high-load may be represented by various metrics, examples of which include extent of Walsh Code usage, extent of transmission power usage, extent of time slot usage, extent of dropped or blocked calls, and extent of noise or poor-signal-quality on the air interface in the coverage area, as may be reported by the relevant BTS and/or one or more mobile stations. Other examples of high-load metrics may be possible as well, as may other examples of problem states in a coverage area (such backhaul load conditions, equipment error conditions, or the like). Generally, the problem state is a state in which it may be beneficial to prevent one or more mobile stations from seeking service in the coverage area.

At block 62, in response to detecting the problem state in the coverage area, the BSC directs the BTS of the coverage area to switch to use of a reserved PN-offset. In practice, the BSC may select an available reserved PN-offset from the reserved PN-offset data 52 and may send a PN-offset-change command to the BTS in much the same way that it is known today for a BSC to direct a BTS to change transmission power or the like. For instance, the BSC may select reserved PN-offset 339 from the pool of reserved PN-offsets, and the PN-offset change command may direct the BTS of coverage area 26 to begin operation on PN-offset 339 in place of operating on PN-offset 6.

The PN-offset-change command may specify the reserved PN-offset on which the BTS should begin operating in the problem coverage area. And in response, the BTS would programmatically switch over to operate in the coverage areas on the designated reserved PN-offset in place of the PN-offset on which the BTS normally operates by default in the coverage area. Thus, all of the RAN resources (e.g., power amplification, Walsh Codes, etc.) that had been devoted to operation on the normal PN-offset in the coverage area may be transferred to operation on the reserved PN-offset.

To make this work in practice, the BSC may carry out one or more associated functions as well. By way of example, if any mobile stations are currently active on the normal PN-offset of the coverage area, the BSC may notify each of those mobile stations of the PN-offset change, to force those mobile stations to hand off to the new, reserved PN-offset. To provide the notification, the BSC may send a handoff direction message (HDM) that effectively removes the normal PN-offset from the mobile station's active set. Further, or instead, once the change to the reserved PN-offset occurs, the BSC may send an HDM to the mobile station to add into the mobile station's active set the reserved PN-offset.

Alternatively, especially in a system where mobile stations actively communicate on only one PN-offset at a time (such as 1×EV-DO for instance), the BSC may instead wait until such active calls on the normal PN-offset are completed before invoking the PN-offset change. Preferably, while waiting, the BSC would not grant any requests for new calls on the normal PN-offset.

In addition, when changing the PN-offset of the coverage area to be a reserved PN-offset, the BSC will preferably revise the neighbor list for each adjacent coverage area, to list as a neighbor the reserved PN-offset rather than the normal PN-offset. For each mobile station that is currently engaged in a call in such an adjacent coverage area, the BSC may then send to the mobile station a control message providing the revised neighbor list. The control message may, for instance, be a neighbor list update message or an in-traffic neighbor list. Further, the BSC may likewise change the neighbor list if any that it broadcasts to idle mobile stations in the adjacent coverage areas. In practice, for instance, when the PN-offset of coverage area 26 is being changed to reserved PN-offset 339, the BSC may change the neighbor list in each of adjacent coverage areas 24 and 28, to list PN-offset 339 in place of PN-offset 6.

As noted above, putting a reserved PN-offset into effect in a coverage area will result in appropriately programmed mobile stations not seeking service in the coverage area when they otherwise would. But at the same time, one or more other mobile stations may still seek service in the coverage area under the reserved PN-offset. For instance, as noted above, mobile stations that have a high-service-level may be programmed to not seek service in a coverage area operating on a reserved PN-offset, whereas mobile stations that operate under a low-service level (in relation to the high-service-level) might not be programmed to not seek service in a coverage area operating on the reserved PN-offset.

Thus, as shown next in FIG. 3, at block 64, the BSC (or more likely the BTS serving the coverage area) may provide communication service to one or more mobile stations that seek service under the reserved PN-offset, while the BSC will not provide communication service to one or mobile stations that are set to not seek service under the reserved PN-offset.

Continuing along in FIG. 3, at block 66, the BSC may next detect that the problem state no longer exists in the coverage area, such that reason no longer exists to prevent one or more mobile stations from seeking service in the coverage area. In response, at block 68, the BSC may then direct the BTS of the coverage area to switch back to its default PN-offset. (For coverage area 26 in the continued example, this would mean a switch back to PN-offset 6 from the reserved PN-offset 339.) Further, the BSC may carry out the associated functions noted above to effect this switch, including preferably changing the neighbor list in each adjacent coverage area back to its original, default form.

Figure 4:
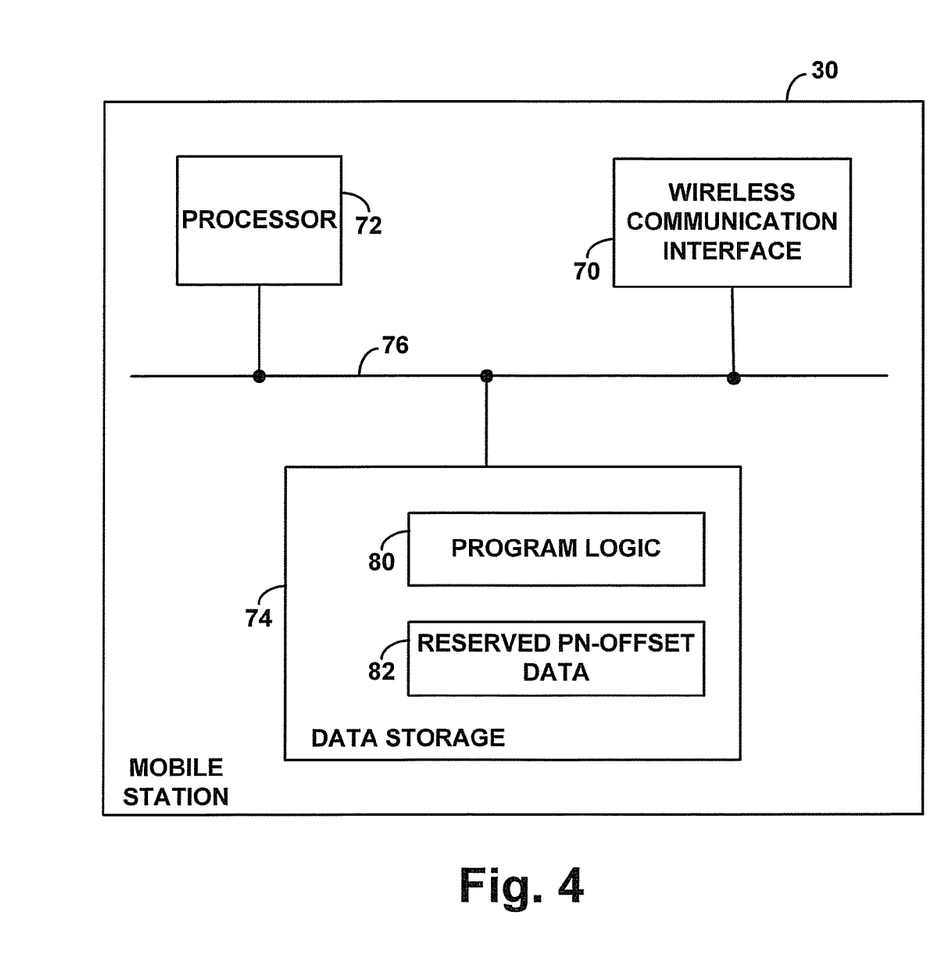
FIG. 4 is a simplified block diagram of a mobile station arranged to implement aspects of the process.

FIG. 4 is next a simplified block diagram of mobile station 30, showing some of the functional components that the mobile station may include to facilitate not seeking service on a reserved PN-offset that is in use as a result of a problem state in a coverage area. This mobile station may be a high-service-level mobile station, as compared with various other mobile stations that are low-service-level mobile stations and that are not arranged to not seek service on a reserved PN-offset. (Alternatively, all mobile stations can be arranged like this one, to not seek service on the reserved PN-offset.)

As shown, the example mobile station 30 includes a wireless communication interface 70, a processor 72, and data storage 74, all of which may be communicatively linked together by a system bus or other mechanism 76. In practice, the mobile station may also include other components, such as a user interface (e.g., if the mobile station is a cell phone or other device that interacts with a user) and local connection circuitry (e.g., if the mobile station is data card arranged for connection to a personal computer or the like), for instance, but those other components are not shown or described here. Further, it should be understood that the particular arrangement of the mobile station (as with that of other entities discussed in this document) can vary greatly from that shown, possibly omitting, integrating, distributing, or substituting one or more components.

Wireless communication interface 70 functions to facilitate air interface communication with RAN 12 according to an agreed air interface protocol, preferably a CDMA or other "spread-spectrum" air interface protocol that uses PN-offsets to uniquely encode communications in various coverage areas. The wireless communication interface 70 may comprise a dedicated chipset, such as an MSM series chipset manufactured by Qualcomm Inc. for instance, designed to engage in air interface communication compliant with the air interface protocol, and the wireless communication interface may further include or be interconnected with one or more antennas to facilitate the air interface communication.

Processor 72 may comprise one or more general purposes processors (e.g., INTEL microprocessors) and/or one or more special purpose processors (e.g., dedicated digital signal processors or application specific integrated circuits). If the processor comprises multiple processors, the processors could work separately or in combination (e.g. in parallel). Further, the processor could be integrated with the wireless communication interface 70. For instance, a single chipset or corresponding circuitry could be provided in the mobile station to function as part or all of the wireless communication interface of the mobile station and to additionally function to carry out various aspects of the present method.

Data storage 74 comprises one or more volatile or non-volatile storage components, such as optical, magnetic, or organic storage, and may be integrated in whole or in part with processor 72. As shown, data storage 74 may contain program logic 80, which can be executed by processor 72 to carry out various mobile station functions described in this document, such as iteratively scanning a sequence of PN-offsets in search of a strong PN-offset on which to operate, and avoiding operation on any PN-offsets designated as reserved PN-offsets. Alternatively or additionally, such functions can be implemented by one or more special-purpose processors such as those noted above, or by other hardware, firmware, and/or software.

Data storage 74 is further shown including reserved PN-offset data 82 that specifies one or more reserved PN-offsets. In practice, this data may be loaded into the data storage 74 of the mobile station at the time of mobile station manufacture, at the time of initial service provisioning of the mobile station (e.g., in store or over the air), and/or at some other time. By way of example, when an owner of the mobile station signs up for a high-service-level (as compared with a low-service-level), the wireless service provider may provision the mobile station with the reserved PN-offset data 82. Preferably, the one or more reserved PN-offsets specified by the data will match the one or more reserved PN-offsets specified in the pool of reserved PN-offsets accessed by the BSC or other RAN entity as noted above. Thus, again, the reserved PN-offsets may be listed in the data as specific PN-offset numbers or may instead be defined by ranges of PN-offsets or in some other manner. Note that the PN-offset data specification could be integrated in program logic 80 as well or instead.

Figure 5:
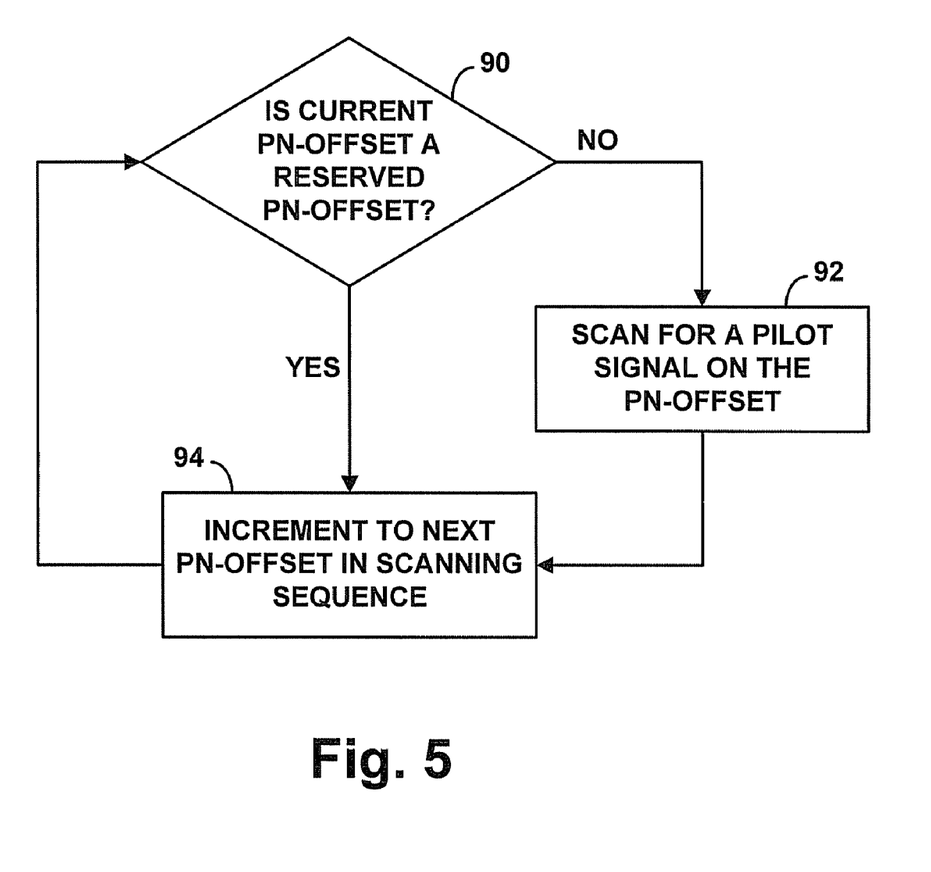
FIG. 5 is a flow chart depicting functions that can be carried out by a mobile station to implement aspects of the process.
Figure 6:
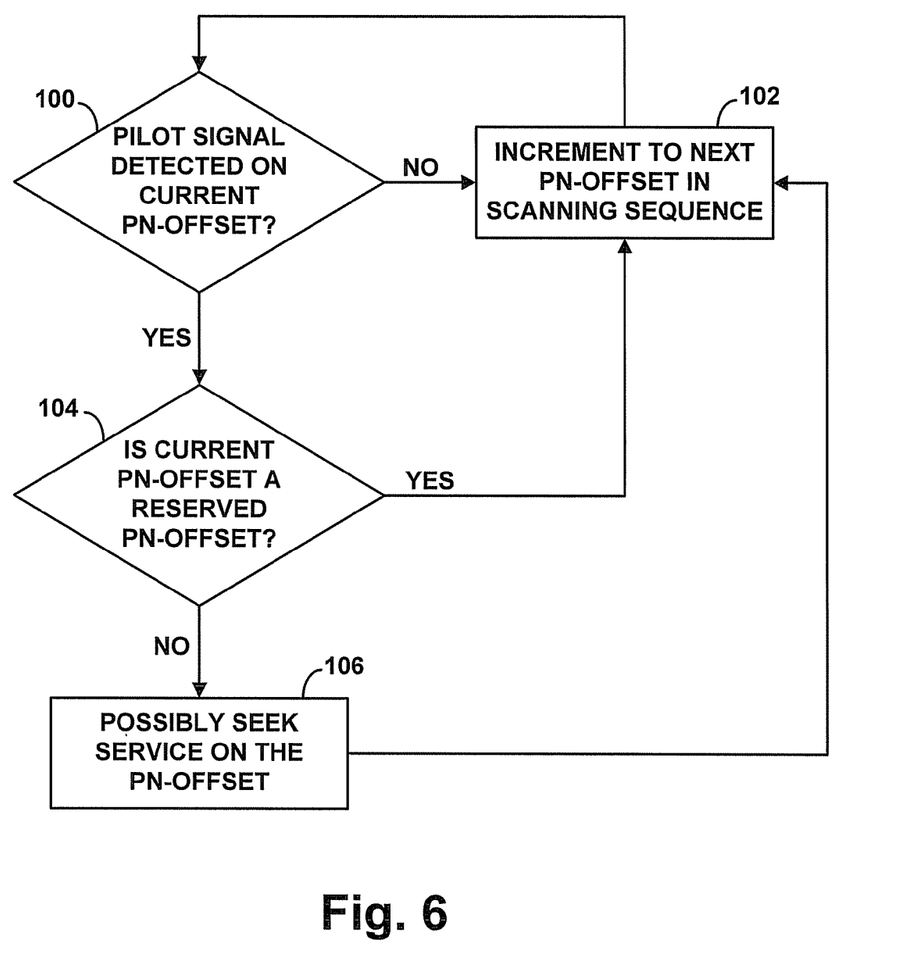
FIG. 6 is another flow chart depicting functions that can be carried out by a mobile station to implement aspects of the process.

FIGS. 5 and 6 are flow charts depicting functions that can be carried out by the mobile station 30. The processes in these flow charts assume that a mobile station is normally set to scan through a sequence of PN-offsets, iteratively attempting to find a pilot signal on each PN-offset, so as to gauge signal strength and determine which PN-offset to use. As noted above, the particular sequence of PN-offsets may vary depending on equipment vendor. However, the normal process would be to scan each possible PN-offset. Thus, in a system having 512 possible PN-offsets, a mobile station would normally scan all 512 of the PN-offsets. Alternatively, if through engineering design some other number of PN-offsets is normally used, a mobile station would scan those possible PN-offsets.

FIG. 5 depicts a process in which the mobile station filters out any reserved PN-offset from its scanning process altogether, so as to avoid seeking service on a reserved PN-offset.

As shown in FIG. 5, at block 90, the mobile station programmatically determines whether the current PN-offset in its scanning sequence is a reserved PN-offset, by reference to its reserved PN-offset data 82.

If not, then at block 92, the mobile station scans the airwaves for a pilot signal on the PN-offset and, if the mobile station finds a pilot signal, the mobile station notes its signal strength to facilitate determination of whether to seek service on that PN-offset. At block 94, the mobile station then increments to a next PN-offset in its scanning sequence. For instance, if the mobile station is set to scan the PN-offsets (e.g., all of them, or those in its remaining set) in numerical order, the mobile station could simply increment to the next number PN-offset. And the mobile station then returns to block 90 and repeats the process.

On the other hand, if the mobile station determines at block 90 that the current PN-offset is a reserved PN-offset, then the mobile station will skip scanning the PN-offset altogether. The mobile station will then proceed to block 94 as above to increment to a next PN-offset in its scanning sequence. Again, for instance, if the mobile station is set to scan PN-offsets (e.g., all of them, or those in its remaining set) in numerical order, the mobile station could simply jump to a next number PN-offset. And as noted above, the mobile station then returns to block 90 and repeats the process.

FIG. 6 depicts an alternative process in which the mobile station may scan a reserved PN-offset but will programmatically not take action to initiate communication on the reserved PN-offset.

As shown in FIG. 6, at block 100, the mobile station scans the current PN-offset in search of a pilot signal and thus determines whether a pilot signal exists on the PN-offset. If the mobile station does not find a pilot signal on the PN-offset, then the mobile station proceeds to block 102, where the mobile station increments to a next PN-offset in its scanning sequence, and the mobile station then returns to block 100 to repeat the process.

If the mobile station finds a pilot signal on the current PN-offset in its scanning sequence, the mobile station may then determine at block 104 whether the PN-offset is a reserved PN-offset, by referring to reserved PN-offset data 82.

If the mobile station determines that the PN-offset is a reserved PN-offset, then the mobile station proceeds directly to block 102, and in turn block 100 as noted above, to increment to the next PN-offset in its scanning sequence and to repeat the process. This way, the mobile station effectively disregards the detected reserved PN-offset by not taking action in response to detecting the reserved PN-offset.

On the other hand, if the mobile station determines that the PN-offset is not a reserved PN-offset, then, at block 106, the mobile station may seek to initiate communication on the PN-offset. For instance, if the signal strength of the detected pilot signal is strong enough to justify operation on the PN-offset, then the mobile station may seek service on the PN-offset (e.g., by beginning to monitor for control channel messages on the PN-offset, originating a call on the PN-offset, or handing off to the PN-offset). Further, the mobile station may proceed likewise to block 102, to check the next PN-offset in its sequence.

An exemplary embodiment has been described above. Those of ordinary skill level in this technology area will appreciate that numerous changes to the embodiment described can be made without deviating from the basic principles of the invention, such as outlined in the claims for instance.

We claim:

1. A system comprising:
   a radio access network (RAN) including a plurality of base transceiver stations (BTSs) radiating to define a plurality of wireless coverage areas, wherein forward-link communications in each wireless coverage area are defined at least in part by a respective PN-offset used to spread the forward-link communications; and mobile stations arranged to be served by the RAN, to scan for BTS signals by attempting to tune iteratively to each of a series of PN-offsets, and to initiate communications with the RAN on detected PN offsets, wherein the RAN is arranged to detect a state of a given wireless coverage area and, in response, to temporarily change the PN-offset of the given wireless coverage area to a reserved PN-offset, wherein at least one of the mobile stations is programmed to not initiate communications with the RAN on the reserved PN-offset.

2. The system of claim 1, wherein the mobile stations are operated by users under subscription agreements with a provider of the RAN.

3. The system of claim 1, wherein each PN-offset of the series of PN-offsets is a 64 chips long, and wherein the sequence consists of 512 PN offsets.

4. The system of claim 1, wherein the forward-link communications are code division multiple access (CDMA) communications, in which the forward-link communications in each wireless coverage area are defined in part by spreading with the respective PN-offset of the wireless coverage area.

5. The system of claim 1, wherein each given mobile station of the at least one of the mobile stations is pre-programmed with data specifying the reserved PN-offset and uses the data as a basis to not initiate communications with the RAN on the reserved PN-offset.

6. The system of claim 5, wherein the given mobile station is programmed to omit the reserved PN-offset from the given mobile station's scanning for BTS signals.

7. The system of claim 5, wherein the given mobile station is programmed to not request communication initiation on the reserved PN-offset when the mobile station detects RAN operation on the reserved PN-offset.

8. The system of claim 1, wherein the state of the wireless coverage area comprises a threshold high-load state.

9. The system of claim 1, wherein the plurality of mobile stations comprises one or more low-service-level mobile stations and one or more high-service-level mobile stations, and wherein the at least one mobile station consists of just the one or more high-service-level mobile stations and thus excludes the one or more low-service-level mobile stations.

10. The system of claim 1, wherein, in temporarily changing the PN-offset of the given wireless coverage area to the reserved PN-offset, the RAN provides notification to hand off any active communication in the given wireless coverage area to the reserved PN-offset.

11. The system of claim 1, wherein, in temporarily changing the PN-offset of the given wireless coverage area to the reserved PN-offset, the RAN waits until there are no calls active calls in the given wireless coverage area.

12. The system of claim 1, wherein the RAN maintains a pool of reserved PN-offsets and selects from the pool the reserved PN-offset to temporarily use for communications in the given wireless coverage area.

13. The system of claim 1, wherein, when the RAN temporarily changes the PN-offset of the given wireless coverage area to the reserved PN-offset, the RAN updates a neighbor list of PN-offsets in at least one adjacent wireless coverage area.

14. A cellular wireless communication device (WCD) arranged to be served by a radio access network (RAN), wherein the RAN includes a plurality of base transceiver stations (BTSs) radiating to define a plurality of wireless coverage areas, wherein forward-link communications in each wireless coverage area are defined at least in part by a respective PN-offset used to spread the forward-link communications, the WCD comprising:
- an antenna structure arranged to wirelessly exchange communications with the RAN;
- stored data specifying one or more reserved PN-offsets each temporarily useable by the RAN in a given wireless coverage area to indicate that communications should not be initiated in the given wireless coverage area;
- a processing unit; and
- program logic executable by the processing unit to scan for BTS signals by attempting to tune iteratively to each of a series of PN-offsets and to initiate communications with the RAN on detected PN-offsets, but, based on the stored data, to not initiate communications with the RAN on any of the one or more reserved PN-offsets.

15. The WCD of claim 14, wherein each PN offset of the series of PN-offsets is a 64 chips long, and wherein the sequence consists of 512 PN offsets.

16. The WCD of claim 14, wherein the program logic is executable to not initiate communications with the RAN on any of the one or more reserved PN-offsets by omitting the one or more reserved PN-offsets from the WCD's scanning for BTS signals.

17. The WCD of claim 14, wherein the program logic is executable to not initiate communications with the RAN on any of the one or more reserved PN-offsets by not requesting communication initiation on a given one of the one or more reserved PN-offsets when the WCD detects RAN operation on the given reserved PN-offsets.

18. A method comprising:
- radiating from a radio access network (RAN) with a plurality of base transceiver stations (BTSs) to define a plurality of wireless coverage areas, wherein forward-link communications in each wireless coverage area are defined at least in part by a respective PN-offset used to spread the forward-link communications;
- providing a plurality of mobile stations arranged to be served by the RAN, to scan for BTS signals by attempting to tune iteratively to each of a series of PN offsets, and to initiate communications with the RAN on detected PN offsets; and
- detecting at the RAN a state of a given wireless coverage area and, in response, temporarily changing the PN-offset of the given wireless coverage area to a reserved PN-offset, wherein at least one of the mobile stations is programmed to not initiate communications with the RAN on the reserved PN-offset.

19. The method of claim 18, wherein the state of the wireless coverage area comprises a threshold high-load state.

20. The method of claim 18, wherein each of the at least one mobile stations is pre-programmed with data specifying the reserved PN-offset and with logic executable to use the data as a basis to not initiate communications with the RAN on the reserved PN-offset.

21. The method of claim 18, further comprising:
- providing, of the plurality of mobile stations, one or more mobile stations that are each not programmed to not initiate communications with the RAN on the reserved PN-offset, but
- providing, of the plurality of mobile stations, the at least one of the mobile stations that is programmed to not initiate communications with the RAN on the reserved PN-offset.

* * * * *